United States Patent
Chen et al.

(10) Patent No.: US 12,543,062 B2
(45) Date of Patent: Feb. 3, 2026

(54) USER PLANE FUNCTION DETERMINATION METHOD AND DEVICE, INFORMATION PROVIDING METHOD AND DEVICE, AND STORAGE MEDIA

(71) Applicant: DATANG MOBILE COMMUNICATIONS EQUIPMENT CO., LTD., Beijing (CN)

(72) Inventors: Shanzhi Chen, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 516 days.

(21) Appl. No.: 17/921,609

(22) PCT Filed: Apr. 21, 2021

(86) PCT No.: PCT/CN2021/088546
§ 371 (c)(1),
(2) Date: Oct. 26, 2022

(87) PCT Pub. No.: WO2021/218718
PCT Pub. Date: Nov. 4, 2021

(65) Prior Publication Data
US 2023/0180038 A1    Jun. 8, 2023

(30) Foreign Application Priority Data
Apr. 30, 2020   (CN) .......................... 202010363629.8

(51) Int. Cl.
*H04W 24/10*   (2009.01)
*H04W 24/08*   (2009.01)

(52) U.S. Cl.
CPC ........... *H04W 24/10* (2013.01); *H04W 24/08* (2013.01)

(58) Field of Classification Search
CPC ....... H04W 24/10; H04W 24/08; H04W 4/02; H04W 76/12; H04W 24/02; H04L 67/10; H04L 41/5009; H04L 41/14; H04L 67/289
See application file for complete search history.

(56) References Cited

U.S. PATENT DOCUMENTS

| 2018/0262924 A1 | 9/2018 | Dao |
| 2019/0215730 A1 | 7/2019 | Qiao |

(Continued)

FOREIGN PATENT DOCUMENTS

| CN | 111083750 A | 4/2020 |
| EP | 3855806 A1  | 7/2021 |

(Continued)

OTHER PUBLICATIONS

First Office Action and search report for Chinese Patent Application No. 202010363629.8 issued by the Chinese Patent Office on May 27, 2023 and it's English translation provided by the foreign associate.

(Continued)

*Primary Examiner* — Kan Yuen
(74) *Attorney, Agent, or Firm* — Ladas & Parry, LLP

(57) ABSTRACT

The present disclosure provides UPF determination method and device, information providing method and device, and media. An NWDAF receives a data analytic request about an application from an SMF and/or an AF, analyzes application run data collected from the SMF and the AF to generate a user experience analytic result and/or a performance analytic result including a user experience analysis and/or a performance analysis for the application corresponding to a location area, the location area including at least one of a UE location, an area where the application locates, or an area where a user plane anchor locates, and provides a data analytic result to the SMF and/or the AF, so that the SMF (Continued)

optimizes a user plane path in accordance with the analytic result and the AF adjusts a position of a target position in accordance with the analytic result.

18 Claims, 7 Drawing Sheets

(56) References Cited

U.S. PATENT DOCUMENTS

| | | | |
|---|---|---|---|
| 2019/0222489 A1 | 7/2019 | Shan | |
| 2019/0357301 A1 | 11/2019 | Li | |
| 2020/0112921 A1* | 4/2020 | Han | H04W 8/06 |
| 2020/0358689 A1* | 11/2020 | Lee | H04L 43/0817 |
| 2021/0250838 A1 | 8/2021 | Lu et al. | |
| 2021/0314906 A1* | 10/2021 | Matolia | H04W 24/10 |
| 2021/0329485 A1 | 10/2021 | Han et al. | |
| 2022/0103443 A1* | 3/2022 | Mary | H04L 43/20 |
| 2022/0311670 A1* | 9/2022 | Li | H04L 41/5032 |
| 2023/0077340 A1* | 3/2023 | Han | H04L 41/5051 709/224 |

FOREIGN PATENT DOCUMENTS

| | | |
|---|---|---|
| KR | 20200018220 A | 2/2020 |
| WO | 2019219038 A1 | 11/2019 |
| WO | 2020032769 A1 | 2/2020 |
| WO | 2021060840 A1 | 4/2021 |

OTHER PUBLICATIONS

"Update Solution 11 for Generalized Data Analytics-Based UPF Selection," SA WG2 Meeting #129, S2-1811535, Oct. 15-19, 2018, Dongguan, China (revision of S2-1811194, S2-1811119), Agenda Item: 6.11, Source: Samsung, Huawei, HiSilicon, Convida Wireless, ZTE, SK Teleco NEC, all pages.

"3rd Generation Partnership Project; Technical Specification Group Services and System Aspects; Study of Enablers for Network Automation for 5G (Release 16), " 3GPP TR 23.791 V16.0.0 (Dec. 2018), all pages.

International Search Report for PCT Application PCT/CN2021/088546 issued on Jul. 21, 2021, and its English Translation provided by WIPO.

Written Opinion for PCT Application PCT/CN2021/088546 issued on Jul. 21, 2021 and its English Translation provided by WIPO.

International preliminary report on Patentability for PCT Application PCT/CN2021/088546 issued on Oct. 27, 2022, and ts English Translation provided by WIPO.

3rd Generation Partnership Project; Technical Specification Group Services and System Aspects; Study on enablers for network automation for the 5G System (5GS); Phase 2 (Release 17) 3GPP TR 23.700-91 V17.0.0, Dec. 31, 2020, all pages.

"Update Solution 11 for Generalized Data Analytics-Based UPF Selection," SA WG2 Meeting #129, S2-1811119, Oct. 15-19, 2018, Dongguan, China (revision of S2-1810334), Agenda Item: 6.11, all pages.

"A new use case and key issue for edge computing support" SA WG2 Meeting #136AH S2-2001559, Jan. 13-Jan. 17, 2020, Incheon, South Korea was S2-2001306, S2-2001228, Source: Samsung, Huawei, HiSilicon, Agenda Item: 8.2, all pages.

"Abnormal analytics clarifications (not "any UE" related)," 3GPP TSG-SA2 Meeting #138-E 82-2003324, Online, Elbonia, Apr. 20, 2020-Apr. 23, 2020, Source to WG: Orange, Huawei, HiSilicon, Source to TSG: S2, all pages.

First Japanese Office Action for the corresponding Japanese Patent Application No. 2022-566298 issued by the Japanese Patent Office on Feb. 6, 2024 and it's English translation provided by the foreign associate.

"Update Solution 11 for Generalized Data Analytics-Based UPF Selection," SA WG2 Meeting #129, S2-1811586, Oct. 15-19, 2018, Dongguan, China (revision of S2-1811535), Source: Samsung, Huawei, HiSilicon, Convida Wireless, ZTE, SK Telecom, NEC, Agenda Item: 6.11.

The Extended European Search Report for the corresponding European Patent Application No. 21795779.4 issued by the European Patent Office on Sep. 21, 2023.

"KI#8: New solution for efficient UP path selection," 3GPP TSG-SA WG2 Meeting #129, S2-1810637, Oct. 15-19, 2018, Dongguan, China, Source: Huawei, HiSilicon, Agenda Item: 6.6, all pages.

"Update Solution 11 for Generalized Data Analytics-BAsed UPF Selection," Sa WG2 Meeting #129, S2-1811586, Oct. 15-19, 2018, Dongguan, China, Source: Samsung, Huawei, HiSilicon, Convida Wireless, ZTE, Sk Telecom, NEC, Agenda Item: 6.11, all pages.

"Key Issue 6 Solution Evaluation and Conclusion" SA WG2 Meeting #129-Bis, S2-1812183, Source: Samsung, Huawei, HiSilicon, ZTE, Agenda Item: 6.11, all pages.

"Solution for KI #2: Edge relocation considering user plane latency," SA WG2 Meeting #136AH, S2-2000823, Jan. 13-17, 2020, Incheon, Korea, Source: Samsung, Agenda Item: 8.5, all pages.

"3rd generation Partnership Project; Technical Specification Group Services and System Aspects; Study of Enablers for Network Automation for 5G (Release 16)" 3GPP TR 23.791 V16.2.0, Jun. 11, 2019.

Office Action in the corresponding EP patent Application No. 21795779.4, issued on Sep. 26, 2024.

\* cited by examiner

--Prior Art--

USER PLANE FUNCTION DETERMINATION METHOD AND DEVICE, INFORMATION PROVIDING METHOD AND DEVICE, AND STORAGE MEDIA

CROSS-REFERENCE TO RELATED APPLICATIONS

This application is the U.S. national phase of PCT Application No. PCT/CN2021/088546 filed on Apr. 21, 2021, which claims a priority to the Chinese patent application No. 202010363629.8 filed on Apr. 30, 2020, the disclosures of which are incorporated herein by reference in their entireties.

TECHNICAL FIELD

The present disclosure relates to the field of wireless communication technology, in particular to User Plane Function (UPF) determination method and device, information providing method and device, and storage media.

BACKGROUND

In a mobile edge computer technology, a computing storage capability and a business service capability are migrated to a network edge, and data is not transmitted back to a cloud as possible, so as to reduce a waiting time and a network cost caused when the data is transmitted from and to the cloud. For $5^{th}$-Generation (5G)-based distributed cloud infrastructure, a 5G user plane and a 5G Mobile Edge Computing (MEC) node are created at the edge through cloudification, and the 5G MEC node provides an MEC application platform to achieve the deployment and management of a third-party application. A user obtains a service through an MEC application.

FIG. 1 shows architecture of an edge computing network. In the architecture, when a User Equipment (UE) needs to access an edge computing server, at first a Protocol Data Unit (PDU) session to a local data network needs to be established. The PDU session is established mainly through the following steps.

1. The UE transmits a PDU session establishment request carrying slice selection assistance information and a Data Network Name (DNN) to a Session Management Function (SMF).

2. After the SMF determines to accept the request from the UE, the SMF establishes the PDU session for the UE. The SMF needs to select a user plane anchor for the to-be-established PDU session, i.e., a UPF. The SMF needs to select/reselect the UPF in accordance with the following information: a dynamic load of the UPF; receiving an analysis (i.e., statistics or prediction) of the UPF load from a Network Data Analytics Functions (NWDAF) when the NWDAF has been deployed; a UPF position; UE position information; receiving an analysis (i.e., statistics or prediction) of UE mobility from the NWDAF when the NWDAF has been deployed; a support condition about a capacity and a capability required by the UPF for a specific UE session; a Data Network Name (DNN); a PDU session type (i.e., IPv4, IPv6, IPv4v6, an Ethernet type or a non-structure type) and (if available) a static Internet Protocol (IP) address/prefix; a Session/Service Continuity (SSC) mode selected for the PDU session; subscription data about the UE; or a Data Network Access Identifier (DNAI).

3. The SMF transmits a PDU session establishment acceptance message to the UE, transmits user plane path configuration information to an access network, and transmits a request message to a selected UPF, so as to complete the configuration of a user plane transmission path.

As a drawback in the related art, there is such a condition where a selected user plane path between the UE and the edge computing server is not an optimal solution.

SUMMARY

An object of the present disclosure is to provide UPF determination method and device, information providing method and device, and a medium, so as to solve the problem that the selected user plane path between the UE and the edge computing server is not an optimal solution.

In one aspect, the present disclosure provides in some embodiments a UPF determination method, including: transmitting, by an SMF, a user experience analytic request for a designated application and/or a performance analytic request for the application to an NWDAF; receiving, by the SMF, a user experience analytic result and/or the performance analytic result for the application from the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and determining, by the SMF, the UPF for providing an edge computing service to the UE in accordance with the user experience analytic result for the application and/or the performance analytic result for the application.

In a possible embodiment of the present disclosure, the determining, by the SMF, the UPF for providing an edge computing service to the UE in accordance with the user experience analytic result for the application and/or the performance analytic result for the application includes: obtaining, by the SMF, an application Identifier (ID) of an application to which the UE currently accesses; matching the application ID for the application to which the UE currently accesses with the user experience analytic result and/or the performance analytic result for the application; when the application ID for the application to which the UE currently accesses matches the user experience analytic result and/or the performance analytic result for the application, selecting a serving anchor UPF corresponding to an entry of optimum user experience or optimum application performance in the analytic results in accordance with a position of the UE; and determining, by the SMF, the serving anchor UPF as a new anchor UPF.

In a possible embodiment of the present disclosure, the method further includes determining a serving anchor UPF in accordance with anchor UPF recommendation information provided by the NWDAF for ensuring optimum user experience and/or service performance.

In a possible embodiment of the present disclosure, the method further includes establishing, by the SMF, an optimum path for the UE to access an edge computing application through the selected new anchor UPF.

In a possible embodiment of the present disclosure, the optimum path for the UE to access the edge computing application is established by the SMF through the selected new anchor UPF in one or more of: triggering a UL-CL insertion procedure, and installing data flow information corresponding to the application ID to a UL-CL so that the UL-CL routes a data flow for accessing the edge computing application to the new anchor UPF; for a PDU session with an IPv6 address assigned for the UE, establishing a branch point and assigning a new IPv6 address prefix, so that the UE accesses the edge computing application through a newly-assigned IPv6 address; and after the UE is requested to establish a new PDU session, selecting the new anchor UPF to provide a service for the UE.

In a possible embodiment of the present disclosure, the user experience analytic result received by the SMF from the NWDAF at least includes user experience distribution of the edge computing application.

In a possible embodiment of the present disclosure, the user experience distribution of the edge computing application includes one or more of: a position of the EC application represented by a DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience distribution of the edge computing application includes anchor UPF recommendation information for ensuring service performance.

In a possible embodiment of the present disclosure, the performance analytic result for the application received by the SMF from the NWDAF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, the performance of the network serving the edge computing application includes anchor UPF recommendation information for ensuring the service performance.

In another aspect, the present disclosure provides in some embodiments an information providing method, including: receiving, by an NWDAF, a user experience analytic request and/or a performance analytic request for a designated application from an SMF and/or an AF; generating, by the NWDAF, a user experience analytic result and/or a performance analytic result for the application, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and transmitting, by the NWDAF, the user experience analytic result and/or the performance analytic result to the SMF to select a user plane anchor and/or a target application.

In a possible embodiment of the present disclosure, data for generating the user experience analytic result and/or the performance analytic result for the application is obtained from the SMF and/or the AF.

In a possible embodiment of the present disclosure, the data for generating the user experience analytic result for the application includes: one or more of the following data collected from the SMF: a timestamp of the collected data, a data network name for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, or user experiences on the application in a target data network identified by the DNAI when different data flows are in use.

In a possible embodiment of the present disclosure, the user experience analytic result for the application returned to the SMF at least includes user experience distribution of the edge computing application.

In a possible embodiment of the present disclosure, the user experience distribution of the edge computing application includes one or more of: a position of the EC application represented by a DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience analytic result and/or the performance analytic result for the application returned to the SMF includes anchor UPF recommendation information for ensuring optimum user experience and/or optimum service performance.

In a possible embodiment of the present disclosure, the user experience analytic result for the application returned to the AF at least includes user experience distribution of the edge computing application.

In a possible embodiment of the present disclosure, the user experience distribution of the edge computing application includes one or more of: a position of the EC application represented by a DNAI; user experiences caused when the UE accesses an application in a target data network at a designated region through a designated UPF; an area where the analysis is valid; a time period within which the analytic result is valid; or estimation of prediction accuracy.

In a possible embodiment of the present disclosure, data for generating the performance analytic result for the application includes: one or more of the following data collected from the SMF: a timestamp of the collected data, a Data Network Name (DNN) for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, user experiences on the application in a target data network identified by the DNAI when different data flows are in use, an actual uplink/downlink transmission rate of an IP flow, an actual uplink/downlink transmission delay of an IP data packet, the total quantity of transmitted data packets, or the quantity of retransmitted data packets.

In a possible embodiment of the present disclosure, the performance analytic result for the application returned to the SMF and/or the AF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, the generating, by the NWDAF, the user experience analytic result for the application includes: associating data collected from the SMF with data collected from the AF in accordance with a timestamp and IP filter information; and mining an association relationship between data through a machine learning algorithm, and generating the user experience analytic result for the application.

In yet another aspect, the present disclosure provides in some embodiments a UPF determination method, including: transmitting, by an EC AS, a user experience analytic request and/or a performance analytic request for an edge computing application to an NWDAF when a UE accesses the edge computing application; receiving, by the EC AS, a user experience analytic result and/or a performance analytic result for the application to the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and determining, by the EC AS, a target DNAI where an optimum EC AS for providing an edge computing service for the UE locates in accordance with the user experience analytic result and/or the performance analytic result for the application, the DNAI being used by an SMF to reselect a UPF.

In a possible embodiment of the present disclosure, the method further includes notifying, by the EC AS, the SMF of the target DNAI where the optimum EC AS locates through AF request influence traffic routing.

In a possible embodiment of the present disclosure, the user experience analytic result received by the EC AS from the NWDAF at least includes user experience distribution of the edge computing application.

In a possible embodiment of the present disclosure, the user experience distribution of the edge computing application includes one or more of: a position of the EC application represented by DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience distribution of the edge computing application includes anchor UPF recommendation information for ensuring service performance.

In a possible embodiment of the present disclosure, the performance analytic result for the application received by the EC AS from the NWDAF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, the performance of the network serving the edge computing application includes anchor UPF recommendation information for ensuring the service performance.

In still yet another aspect, the present disclosure provides in some embodiments an SMF, including a processor, a memory and a transceiver. The processor is configured to read a program in the memory, so as to: transmit a user experience analytic request for a designated application and/or a performance analytic request for the application to an NWDAF; receive a user experience analytic result and/or the performance analytic result for the application from the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and determine the UPF for providing an edge computing service to the UE in accordance with the user experience analytic result for the application and/or the performance analytic result for the application. The transceiver is configured to receive and transmit data under the control of the processor.

In a possible embodiment of the present disclosure, when determining the UPF for providing an edge computing service to the UE in accordance with the user experience analytic result for the application and/or the performance analytic result for the application, the processor is further configured to: obtain an application ID of an application to which the UE currently accesses; match the application ID for the application to which the UE currently accesses with the user experience analytic result and/or the performance analytic result for the application; when the application ID for the application to which the UE currently accesses matches the user experience analytic result and/or the performance analytic result for the application, select a serving anchor UPF corresponding to an entry of optimum user experience or optimum application performance in the analytic results in accordance with a position of the UE; and determine the serving anchor UPF as a new anchor UPF.

In a possible embodiment of the present disclosure, the processor is further configured to determine a serving anchor UPF in accordance with anchor UPF recommendation information provided by the NWDAF for ensuring optimum user experience and/or service performance.

In a possible embodiment of the present disclosure, the processor is further configured to establish an optimum path for the UE to access an edge computing application through the selected new anchor UPF.

In a possible embodiment of the present disclosure, the optimum path for the UE to access the edge computing application is established by the SMF through the selected new anchor UPF in one or more of: triggering a UL-CL insertion procedure, and installing data flow information corresponding to the application ID to a UL-CL so that the UL-CL routes a data flow for accessing the edge computing application to the new anchor UPF; for a PDU session with an IPv6 address assigned for the UE, establishing a branch point and assigning a new IPv6 address prefix, so that the UE accesses the edge computing application through a newly-assigned IPv6 address; and after the UE is requested to establish a new PDU session, selecting the new anchor UPF to provide a service for the UE.

In a possible embodiment of the present disclosure, the user experience analytic result received by the SMF from the NWDAF at least includes user experience distribution of the edge computing application.

In a possible embodiment of the present disclosure, the user experience distribution of the edge computing application includes one or more of: a position of the EC application represented by a DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience distribution of the edge computing application includes anchor UPF recommendation information for ensuring service performance.

In a possible embodiment of the present disclosure, the performance analytic result for the application received from the NWDAF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, the performance of the network serving the edge computing application includes anchor UPF recommendation information for ensuring the service performance.

In still yet another aspect, the present disclosure provides in some embodiments an NWDAF, including a processor, a memory and a transceiver. The processor is configured to read a program in the memory, so as to: receive a user experience analytic request and/or a performance analytic request for a designated application from an SMF and/or an AF; generate a user experience analytic result and/or a performance analytic result for the application, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and transmit the user experience analytic result and/or the performance analytic result to the SMF to select a user plane anchor and/or a target application. The transceiver is configured to receive and transmit data under the control of the processor.

In a possible embodiment of the present disclosure, data for generating the user experience analytic result and/or the performance analytic result for the application is obtained from the SMF and/or the AF.

In a possible embodiment of the present disclosure, the data for generating the user experience analytic result for the application includes: one or more of the following data collected from the SMF: a timestamp of the collected data, a Data Network Name (DNN) for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, or user experiences on the application in a target data network identified by the DNAI when different data flows are in use.

In a possible embodiment of the present disclosure, the user experience analytic result for the application returned to the SMF at least includes user experience distribution of the edge computing application.

In a possible embodiment of the present disclosure, the user experience distribution of the edge computing application includes one or more of: a position of the EC application represented by a DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience analytic result and/or the performance analytic result for the application returned to the SMF includes anchor UPF recommendation information for ensuring optimum user experience and/or optimum service performance.

In a possible embodiment of the present disclosure, the user experience analytic result for the application returned to the AF at least includes user experience distribution of the edge computing application.

In a possible embodiment of the present disclosure, the user experience distribution of the edge computing application includes one or more of: a position of the EC application represented by a DNAI; user experiences caused when the UE accesses an application in a target data network at a designated region through a designated UPF; an area where the analysis is valid; a time period within which the analytic result is valid; or estimation of prediction accuracy.

In a possible embodiment of the present disclosure, data for generating the performance analytic result for the application includes: one or more of the following data collected from the SMF: a timestamp of the collected data, a data network name for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, user experiences on the application in a target data network identified by the DNAI when different data flows are in use, an actual uplink/downlink transmission rate of an IP flow, an actual uplink/downlink transmission delay of an IP data packet, the total quantity of transmitted data packets, or the quantity of retransmitted data packets.

In a possible embodiment of the present disclosure, the performance analytic result for the application returned to the SMF and/or the AF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; and a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, when generating the user experience analytic result for the application, the processor is further configured to: associate data collected from the SMF with data collected from the AF in accordance with a timestamp and IP filter information; and mine an association relationship between data through a machine learning algorithm, and generate the user experience analytic result for the application.

In still yet another aspect, the present disclosure provides in some embodiments an EC AS, including a processor, a memory and a transceiver. The processor is configured to read a program in the memory, so as to: transmit a user experience analytic request and/or a performance analytic request for an edge computing application to an NWDAF when a UE accesses the edge computing application; receive a user experience analytic result and/or a performance analytic result for the application to the NWDAF, the user experience analytic result and/or the performance analytic result including a user experience analysis and/or a performance analysis for the application corresponding to a location area, wherein the location area includes at least one of a UE location, an area where the application locates, or an area where a user plane anchor locates; and determine a target DNAI where an optimum EC AS for providing an edge computing service for the UE locates in accordance with the user experience analytic result and/or the performance analytic result for the application, the DNAI being used by an SMF to reselect a UPF. The transceiver is configured to receive and transmit data under the control of the processor.

In a possible embodiment of the present disclosure, the processor is further configured to notify the SMF of the target DNAI where the optimum EC AS locates through AF request influence traffic routing.

In a possible embodiment of the present disclosure, the user experience analytic result received by the EC AS from the NWDAF at least includes user experience distribution of the edge computing application.

In a possible embodiment of the present disclosure, the user experience distribution of the edge computing application includes one or more of: a position of the EC application represented by a DNAI; or a user plane anchor UPF serving the UE. The user experience distribution of the EC application includes one or more of the following parameters: an area where the analysis is valid; a time period within which the analytic result is valid; or estimation of prediction accuracy.

In a possible embodiment of the present disclosure, the user experience distribution of the edge computing application includes anchor UPF recommendation information for ensuring service performance.

In a possible embodiment of the present disclosure, the performance analytic result for the application received by the EC AS from the NWDAF includes one or more of: an edge computing application ID; an identifier of a slice to which the edge computing application belongs; or performance of a network serving the edge computing application.

In a possible embodiment of the present disclosure, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

In a possible embodiment of the present disclosure, the performance of the network serving the edge computing application includes anchor UPF recommendation information for ensuring the service performance.

In still yet another aspect, the present disclosure provides in some embodiments a UPF determination device, including: an SMF transmission module configured to transmit a user experience analytic request for a designated application and/or a performance analytic request for the application to an NWDAF; an SMF reception module configured to receive a user experience analytic result and/or the performance analytic result for the application from the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and an SMF determination module configured to determine the UPF for providing an edge computing service to the UE in accordance with the user experience analytic result for the application and/or the performance analytic result for the application.

In still yet another aspect, the present disclosure provides in some embodiments an information providing device, including: an NWDAF reception module configured to receive a user experience analytic request and/or a performance analytic request for a designated application from an SMF and/or an AF; an NWDAF generation module configured to generate a user experience analytic result and/or a performance analytic result for the application, the user experience analytic result and/or the performance analytic result including a user experience analysis and/or a performance analysis for the application corresponding to a location area, wherein the location area includes at least one of a UE location, an area where the application locates, or an area where a user plane anchor locates; and an NWDAF transmission module configured to transmit the user experience analytic result and/or the performance analytic result to the SMF so that the SMF selects a user plane anchor and/or a target application.

In still yet another aspect, the present disclosure provides in some embodiments a UPF determination device, including: an EC AS transmission module configured to transmit a user experience analytic request and/or a performance analytic request for an edge computing application to an NWDAF when a UE accesses the edge computing application; an EC AS reception module configured to receive a user experience analytic result and/or a performance analytic result for the application to the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and an EC AS determination module configured to determine a target DNAI where an optimum EC AS for providing an edge computing service for the UE locates in accordance with the user experience analytic result and/or the performance analytic result for the application, the DNAI being used by an SMF to reselect a UPF.

In still yet another aspect, the present disclosure provides in some embodiments a computer-readable storage medium storing therein a computer program for implementing the above-mentioned UPF determination method or the above-mentioned information providing method.

The present disclosure has the following beneficial effects.

According to the embodiments of the present disclosure, upon the receipt of a data analytic request related to the application from the SMF and/or the AF, the NWDAF analyzes the application run data collected by the SMF and the AF. For example, the generated data analytic result includes the user experience or service running performance corresponding to one or more of the position for the application, the area where the UE locates, or the user plane anchor position. Then, the NWDAF transmits the data analytic result to the SMF and/or the AF. The user experience analytic result and/or the performance analytic result includes a user experience analysis and/or a performance analysis for the application corresponding to a location area, and the location area includes at least one of a UE location, an area where the application locates, or an area where a user plane anchor locates, so that the SMF optimizes a user plane path in accordance with the analytic result and the AF adjusts a position of a target application in accordance with the analytic result.

Hence, in the embodiments of the present disclosure, the user plane path between the UE and the edge computing server is no longer selected through inquiring a DNS, and instead, a transmission path and a target service server are selected in accordance with the user experience or the service performance. As a result, it is able to ensure the user experience and the service performance accordingly.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

It is found that, in the related art, a user plane path between a UE and an edge computing server is mainly selected by an SMF in accordance with a position of the UE and network topological information. The edge computing server is merely selected through inquiring a Domain Name Service (DNS) without taking user experience into consideration, so an optimum user plane path and an optimum edge computing service may not be selected, and thereby it is impossible to ensure the user experience or service performance. For example, a UPF 1 and a UPF 2 are currently capable of providing services for the UE, the UPF 1 is connected to a DNAI 1, and the UPF 2 is connected to a DNAI 2. The UPF 1 locates closer to the UE, but the better user experience is provided by a service application in the DNAI 2. In the related art, the SMF may select the UPF 1 rather than the UPF 2 to provide the service, so it is impossible to ensure the user experience in a better manner.

However, in a part of edge computing scenarios, the end-to-end user experience or service performance needs to be ensured, e.g., panorama stitching, collaborative navigation or collision warning broadcasting in an Internet of Vehicle environment. For the above-mentioned reasons, in a current $3^{rd}$-Generation Partnership Project (3GPP) network, it is impossible to ensure that the selected path is an optimum path capable of ensuring the user experience. In addition, usually an edge computing application service is determined by the UE in accordance with a DNS query result, so it is impossible for the selected edge computing application server to ensure the best user experience or the optimum service performance.

Hence, an object of the present disclosure is to provide a scheme for establishing or modifying a user pane data transmission path in accordance with a data analytic result from an NWDAF, so as to enable the UE to access a most appropriate edge computing service server through the optimum user plane path, thereby to ensure the user experience.

The following description will be given in conjunction with the embodiments and drawings.

The following description will be given from an SMF side, an AF side and an NWDAF side. In addition, a cooperative instance is provided so as to facilitate the understanding of the schemes in the embodiments of the present disclosure. However, it does not mean that the schemes must be implemented cooperatively or separately. In actual use, when the schemes are implemented by the terminal and the base station separately, it is also able to solve problems at the terminal side and the base station. When the schemes are adopted cooperatively, it is able to achieve a better effect.

The NWDAF will be described at first.

Figure 1:
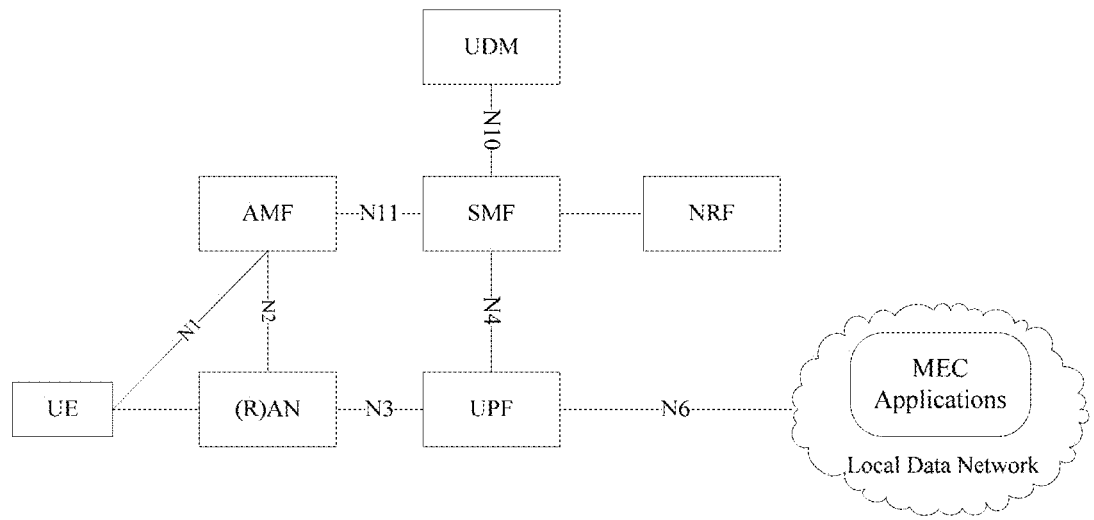
FIG. 1 is a schematic view showing architecture of a conventional edge computing network.
Figure 2:
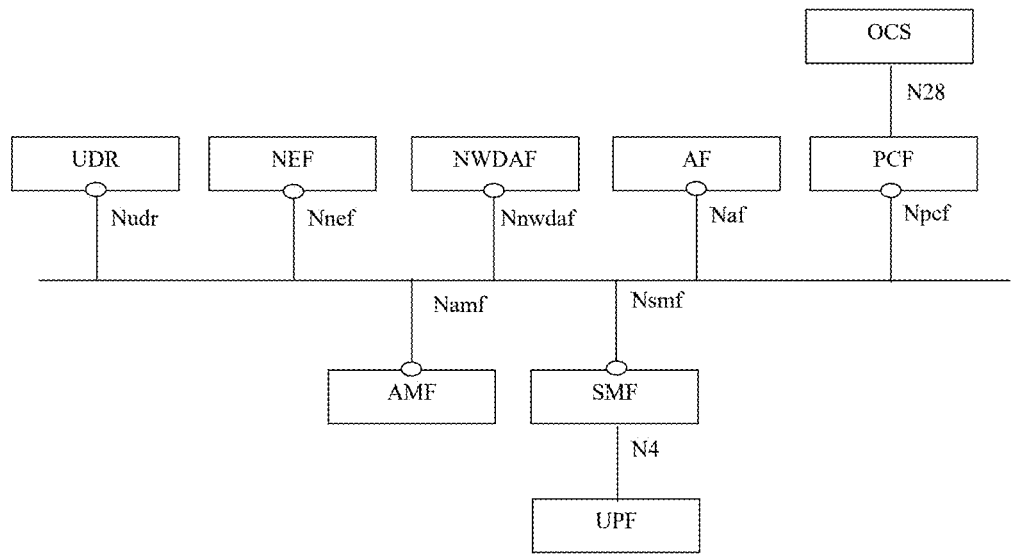
FIG. 2 is a schematic view showing 5GC architecture supporting network data analysis according to one embodiment of the present disclosure.

FIG. 2 shows $5^{th}$-Generation Core network (5GC) architecture supporting network data analysis. As shown in FIG. 2, in the architecture, the NWDAF is a network analysis function managed by an operator, and it provides a data analysis service for a 5GC network function, an Application Function (AF) and an Operation, Administration and Maintenance (OAM). The analytic result may be historical statistical information or prediction information. The NWDAF may serve one or more network slices.

In a 5GC, different NWDAF instances are used to provide different types of dedicated analyses. In order to enable a consumer Network Function (NF) to discover an appropriate NWDAF instance to provide the analysis of a specific type, the NWDAF instance needs to provide an analytic ID supported by the NWDAF when it is registered in a Network Repository Function (NRF), and the analytic ID represents an analysis type. In this way, the consumer NF may provide the analytic ID to indicate the type of analysis when it inquires the NWDAF instance in the NRF.

The 5GC network function and the OAM determine how to improve the network performance in accordance with the data analysis from the NWDAF.

The NWDAF communicates with the other 5GC NF and the OAM via a service-oriented interface in the related art.

In the scheme of establishing or modifying the user plane data transmission path in accordance with the data analytic result from the NWDAF, a relevant device may request the NWDAF to analyze relevant input data for User Plane (UP) optimization. The NWDAF generates the data analytic result, which includes a correspondence between one or more of a location area where the UE locates, a position where the application locates, or a user plane anchor position and the user experience or the performance of the edge computing application. Then, the NWDAF transmits the information to the SMF and the AF. The SMF selects an UP anchor capable of providing optimal Quality of Experience (QoE) or performance in accordance with the UE location. The AF also determines whether it is necessary to perform service relocation and target DNAI reselection.

The following description will be given from the NWDAF side, the SMF side and the AF side in conjunction with embodiments.

Figure 3:
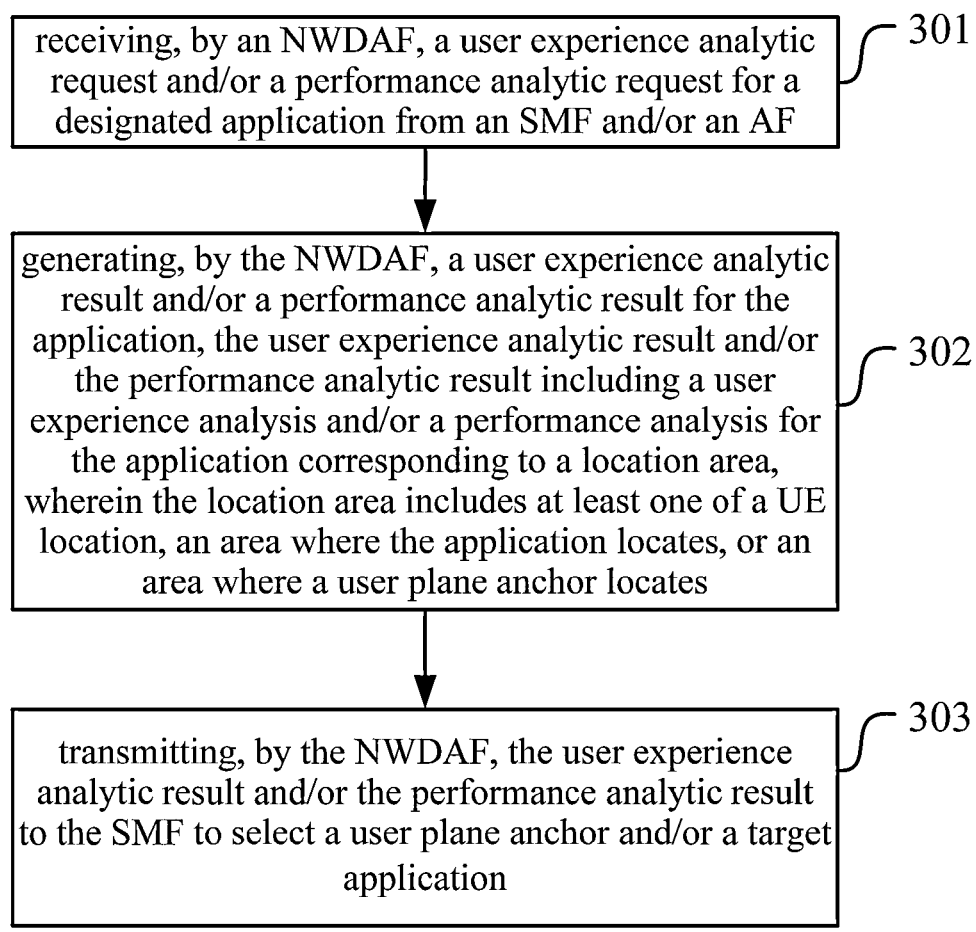
FIG. 3 is a flow chart of an information providing method at an NWDAF side according to one embodiment of the present disclosure.

The present disclosure provides in some embodiments an information providing method at the NWDAF side which, as shown in FIG. 3, includes: Step 301 of receiving, by an NWDAF, a user experience analytic request and/or a performance analytic request for a designated application from an SMF and/or an AF; Step 302 of generating, by the NWDAF, a user experience analytic result and/or a performance analytic result for the application, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and Step 303 of transmitting, by the NWDAF, the user experience analytic result and/or the performance analytic result to the SMF to select a user plane anchor and/or a target application.

During the implementation, the designated application is mainly an EC application transmitted by the SMF and/or the AF when determining the UPF for providing the edge computing service for the UE, so as to obtain the user experience analysis and/or the performance analysis for the EC application.

During the implementation, data for generating the user experience analytic result and/or the performance analytic result for the application is obtained from the SMF and/or the AF.

During the implementation, data for generating the user experience analytic result and/or the performance analytic result for the EC application is obtained from the SMF and/or the AF.

1. The user experience analytic result for the EC application will be described hereinafter.

During the implementation, the data for generating the user experience analytic result for the EC application includes: one or more of the following data collected from the SMF: a timestamp of the collected data, a data network name for accessing the EC application, slice information for accessing the EC application, an EC application ID, an ID for a data flow visiting an EC application server, or an identifier of an anchor UPF being used to forward the data flow visiting the EC application server; and one or more of the following data collected from the AF: the EC application ID, the ID of the data flow visiting the EC application server, a position of an EC application represented by a DNAI, or user experiences on the EC application in a target data network identified by the DNAI when different data flows are in use.

During the implementation, the user experience analytic result for the EC application returned to the SMF at least includes user experience distribution of the edge computing application.

During the implementation, the user experience distribution of the edge computing application includes one or more of: a position of the EC application represented by a DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience analytic result and/or the performance analytic result for the application returned to the SMF includes anchor UPF recommendation information for ensuring optimum user experience and/or optimum service performance.

To be specific, when a request message from the SMF carries such filtering conditions as the UE location, the application ID and/or the slicer ID, the NWDAF provides the anchor UPF recommendation information that meets the filtering conditions and is capable of ensure the optimum service performance to the SMF.

During the implementation, the user experience analytic result for the EC application returned to the AF at least includes user experience distribution of the edge computing application.

During the implementation, the user experience distribution of the edge computing application includes one or more of: a position of the EC application represented by a DNAI; user experiences caused when the UE accesses an application in a target data network at a designated region through a designated UPF; an area where the analysis is valid; a time period within which the analytic result is valid; or estimation of prediction accuracy.

During the implementation, the user experience distribution of the EC application includes anchor UPF recommendation information for ensuring the service performance.

2. The performance analytic result for the EC application will be described hereinafter.

During the implementation, data for generating the performance analytic result for the EC application includes: one or more of the following data collected from the SMF: a timestamp of the collected data, a data network name for accessing the EC application, slice information for accessing the EC application, an EC application ID, an ID of a data flow visiting an EC application server, or an identifier of an anchor UPF being used to forward the data flow visiting the EC application server; and one or more of the following data collected from the AF: the EC application ID, the ID of the data flow visiting the EC application server, a position of an EC application represented by a DNAI, user experiences on the EC application in a target data network identified by the DNAI when different data flows are in use, an actual uplink/downlink transmission rate of an IP flow, an actual uplink/downlink transmission delay of an IP data packet, the total quantity of transmitted data packets, or the quantity of retransmitted data packets.

During the implementation, the performance analytic result for the EC application returned to the SMF and/or the AF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, the network performance for the EC application includes anchor UPF recommendation information for ensuring the service performance.

During the implementation, the generating, by the NWDAF, the user experience analytic result for the application includes: associating data collected from the SMF with data collected from the AF in accordance with a timestamp and IP filter information; and mining an association relationship between data through a machine learning algorithm, and generating the user experience analytic result for the application.

Figure 4:
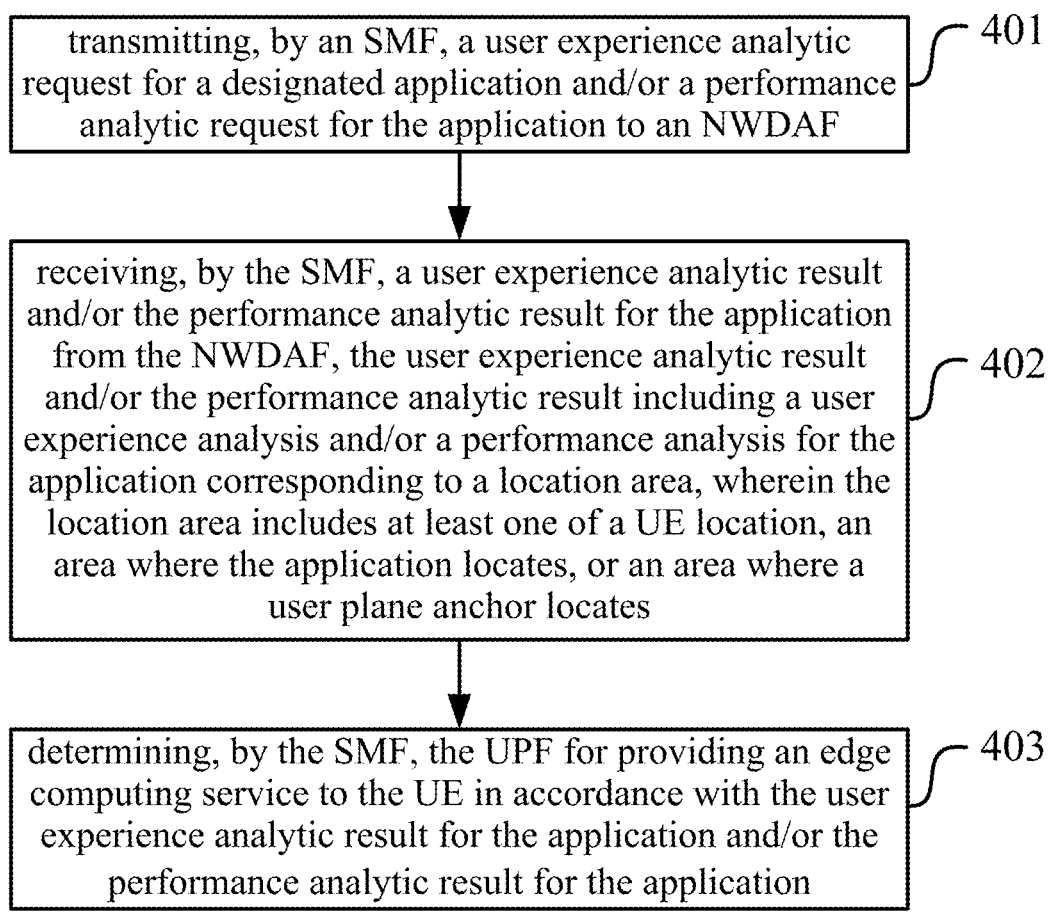
FIG. 4 is a flow chart of a UPF determination method at an SMF side according to one embodiment of the present disclosure.

The present disclosure further provides in some embodiments a UPF determination method at an SMF side which, as shown in FIG. 4, includes: Step 401 of transmitting, by an SMF, a user experience analytic request for a designated application and/or a performance analytic request for the application to an NWDAF; Step 402 of receiving, by the SMF, a user experience analytic result and/or the performance analytic result for the application from the NWDAF, the user experience analytic result and/or the performance analytic result including a user experience analysis and/or a performance analysis for the application corresponding to a location area, wherein the location area includes at least one of a UE location, an area where the application locates, or an area where a user plane anchor locates; and Step 403 of determining, by the SMF, the UPF for providing an edge computing service to the UE in accordance with the user experience analytic result for the application and/or the performance analytic result for the application.

During the implementation, the determining, by the SMF, the UPF for providing an edge computing service to the UE in accordance with the user experience analytic result for the application and/or the performance analytic result for the application includes: obtaining, by the SMF, an application ID of an application to which the UE currently accesses; matching the application ID for the application to which the UE currently accesses with the user experience analytic result and/or the performance analytic result for the EC application; when the application ID for the EC application to which the UE currently accesses matches the user experience analytic result and/or the performance analytic result for the application, selecting a serving anchor UPF corresponding to an entry of optimum user experience or optimum application performance in the analytic results in accordance with a position of the UE; and determining, by the SMF, the serving anchor UPF as a new anchor UPF.

During the implementation, the method further includes determining a serving anchor UPF in accordance with anchor UPF recommendation information provided by the NWDAF for ensuring optimum user experience and/or service performance.

During the implementation, the method further includes establishing, by the SMF, an optimum path for the UE to access an edge computing application through the selected new anchor UPF.

The optimum path for the UE to access the edge computing application is established by the SMF through the selected new anchor UPF in one or more of: triggering an Uplink Classifier (UL-CL) insertion procedure, and installing data flow information corresponding to the application ID to a UL-CL so that the UL-CL routes a data flow for accessing the edge computing application to the new anchor UPF; for a PDU session with an IPv6 address assigned for the UE, establishing a branch point and assigning a new IPv6 address prefix, so that the UE accesses the edge computing application through a newly-assigned IPv6 address; and after the UE is requested to establish a new PDU session, selecting the new anchor UPF to provide a service for the UE.

During the implementation, the user experience analytic result received by the SMF from the NWDAF at least includes user experience distribution of the edge computing application.

During the implementation, eh user experience distribution of the edge computing application includes one or more of: a position of the EC application represented by a DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience distribution of the edge computing application includes anchor UPF recommendation information for ensuring service performance.

During the implementation, the performance analytic result for the application received by the SMF from the NWDAF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, the performance of the network serving the edge computing application includes anchor UPF recommendation information for ensuring the service performance.

Figure 5:
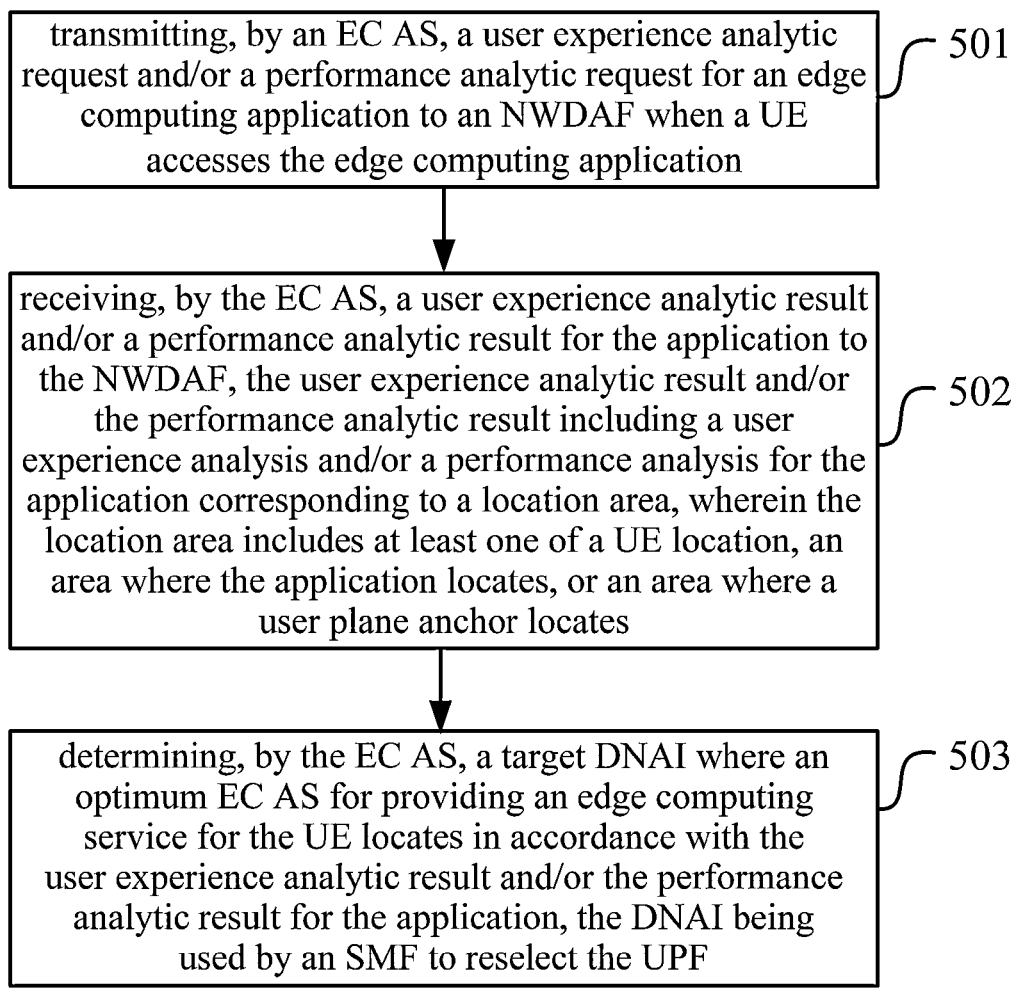
FIG. 5 is a flow chart of a UPF determination method at an AF side according to one embodiment of the present disclosure.

The present disclosure further provides in some embodiments a UPF determination method at an AF side which, as show in FIG. 5, includes: Step 501 of transmitting, by an EC AS, a user experience analytic request and/or a performance analytic request for an edge computing application to an NWDAF when a UE accesses the edge computing application; Step 502 of receiving, by the EC AS, a user experience analytic result and/or a performance analytic result for the application to the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and Step 503 of determining, by the EC AS, a target DNAI where an optimum EC AS for providing an edge computing service for the UE locates in accordance with the user experience analytic result and/or the performance analytic result for the application, the DNAI being used by an SMF to reselect a UPF.

During the implementation, the method further includes notifying, by the EC AS, the SMF of the target DNAI where the optimum EC AS locates through AF request influence traffic routing.

During the implementation, the user experience analytic result received by the EC AS from the NWDAF at least includes user experience distribution of the edge computing application.

During the implementation, the user experience distribution of the edge computing application includes one or more of: a position of the EC application represented by DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience distribution of the edge computing application includes anchor UPF recommendation information for ensuring service performance.

During the implementation, the performance analytic result for the application received by the EC AS from the NWDAF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, the performance of the network serving the edge computing application includes anchor UPF recommendation information for ensuring the service performance.

The following description will be given in conjunction with the embodiments.

First Embodiment

In this embodiment, the NWDAF collects data and generates the user experience analysis for the EC application.

In order to generate the user experience analysis for the EC application deployed on a 3GPP network, the NWDAF collects relevant data from the SMF and the AF.

The data collected from the SMF is shown in the following table.

| Information | Description |
| --- | --- |
| Timestamp | Timestamp of the collected data |
| DNN | Data network name for accessing the EC application |
| S-NSSAI | Slice information for accessing the EC application |
| Application ID | Identifier of the EC application |
| IP filter information | IDs of data flows visiting the EC application server, e.g., IP quintet |
| Anchor UPF ID | Identifier of an anchor UPF being used to forward the data flow visiting the EC application server |

The data collected from the AF is shown in the following table.

| Information | Description |
| --- | --- |
| Application ID | Identifier of the EC application |
| IP filter information | IDs of data flows visiting the EC application server, e.g., IP quintet |
| Locations of Application | Position of the EC application, represented by DNAI |
| Service Experience | User experiences on the EC application in a target data network identified by a DNAI when different data flows are in use, represented by Mean Opinion Score (MOS) |
| Timestamp | |

The NWDAF may associate the data collected form the SMF with the data collected from the AF in accordance with the timestamp and the IP filter information. The NWDAF may mine the association relationship between the data through a machine learning algorithm, and the generated data analysis is shown in the following table.

TABLE 1 user experience analysis of EC application (> represents that there is an inclusive relationship among the entries)

| Information | Description |
| --- | --- |
| EC Application ID | Identifier of the EC application |
| S-NSSAI | Identifier of a slice to which the EC application belongs |
| EC Service experiences (0-x) | User experience distribution of the EC application |
| >APP location | Position of the EC application, represented by DNAI |
| >Serving anchor UPF | User plane anchor UPF providing a service for the UE, identified by a UPF ID or an IP address of the UPF at an N6 interface |
| >Service Experience | User experiences caused when the UE accesses an application in a target data network at a designated region through a designated UPF, represented by MOS |
| >Location criteria | Area where the analysis is valid |
| >Validity period | Time period within which the analytic result is valid |
| >Confidence | Estimation of prediction accuracy |

Second Embodiment

In this embodiment, the NWDAF provides the user experience analysis for the EC application to the SMF.

The data analysis provided by the NWDAF includes contents in Table 1. In addition, when requesting the user experience analysis, the SMF may also request the NWDAF to directly provide the anchor UPF recommendation information for ensuring the user experience or the service performance.

Figure 6:
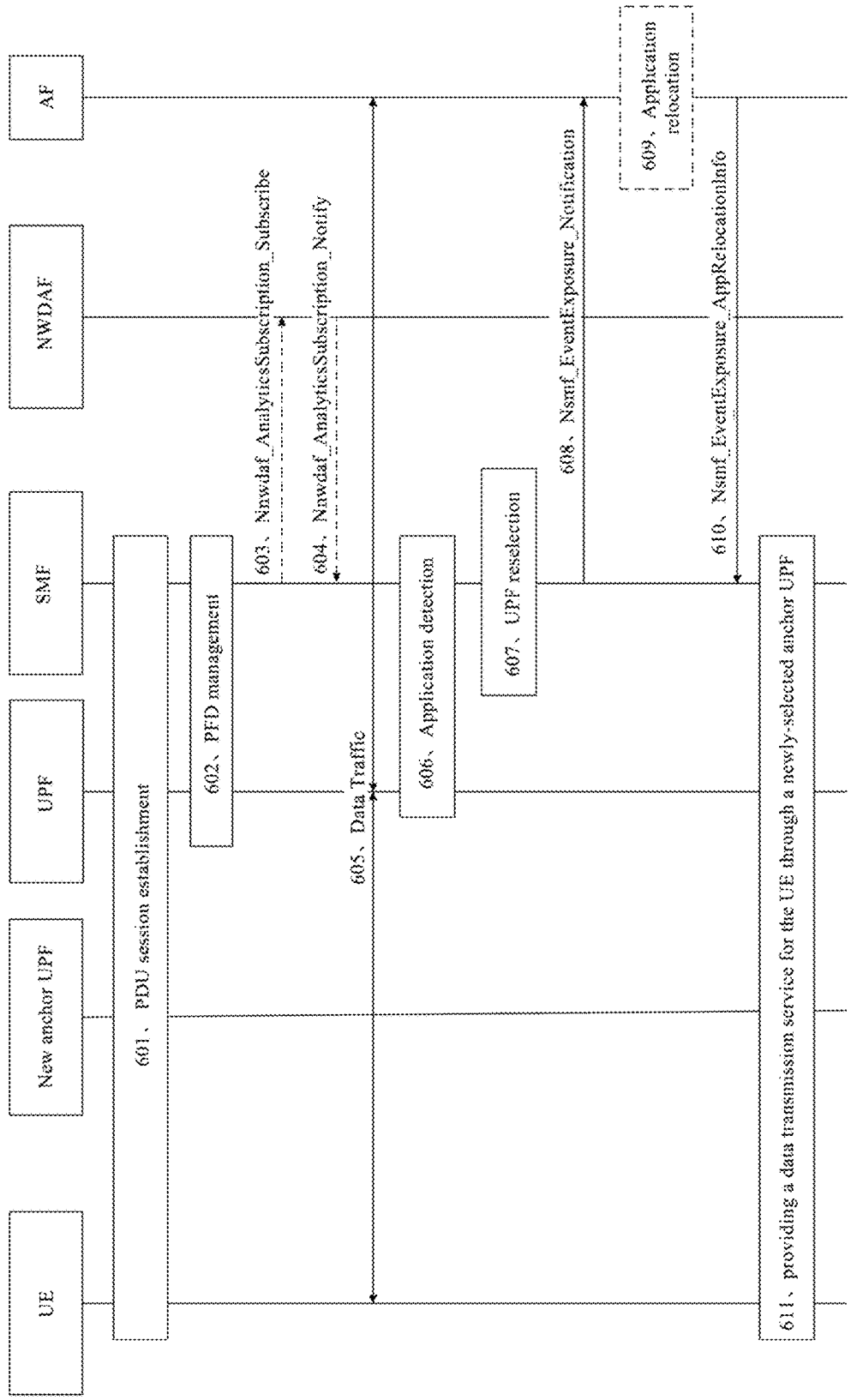
FIG. 6 is a schematic view showing a procedure of providing, by an NWDAF, a data analytic result to an SMF according to a second embodiment of the present disclosure.

FIG. 6 shows a procedure of providing, by the NWDAF, the data analytic result to the SMF in this embodiment. As shown in FIG. 6, based on the analysis provided by the NWDAF, the SMF may optimize the user plane path when the UE accesses the EC application, and the procedure includes the following steps.

Step 601: PDU session establishment.

The UE establishes a PDU session, and Single-Network Slice Selection Assistance Information (S-NSSAI) and DNN carried in the PDU session represents that the PDU session will access an edge network.

Step 602: Packet Flow Descriptor (PFD) management performed by the UPF and the SMF.

In order to determine an optimum path for accessing the edge network, the SMF may: (A) perform application detection to obtain an application accessed by the UE (identified by an application identifier); and (B) request the NWDAF to provide the data analysis for accessing the edge application.

The SMF obtains the PFD of the PDU session from a UDR, generates Packet Detection Rule), and configures it to the UPF. During the configuration of the PDF, the SMF further requests the UPF to perform the application detection, i.e., to report a PDR identifier conforming to a data packet transmitted by the UE.

Step 603: Nnwdaf_AnalyticsSubscription_Subscribe.

Step 604: Nnwdaf_AnalyticsSubscription_Notify.

When the SMF fails to subscribe the QoS analysis for the EC application from the NWDAF, the SMF transmits a subscription request to the NWDAF, and the request carries the application ID and the location of the UE obtained from the PFD. After the completion of the data analysis, the NWDAF returns the user experience analysis for the EC application to the SMF.

Step 605: Data traffic.

When the UPF has detected that the data transmitted by the UE matches the PDR, the UPF reports to the SMF a rule ID of the PDR, so that the SMF obtains the application ID for the application currently accessed by the UE.

Step 606: Application detection.

Step 607: UPF re-selection.

When the application ID for the application accessed by the UE matches the user experience analysis for the EC application provided by the NWDAF, the SMF further selects an entry with optimum user experience from the analytic result in accordance with the position of the UE, and then obtains information about the serving anchor UPF. The SMF determines the serving anchor UPF as a new anchor UPF.

Step 608: Nsmf_EventExposure_Notification.

Step 609: Application relocation.

Step 610: Nsmf_EventExposure_AppRelocationInfo.

After the change of the anchor UPF, the SMF transmits, to the AF, a notification indicating that the user plane anchor has changed as well as a target DNAI using a method known in the related art. The application relocation may be performed at an application layer. At this time, the AF needs to transmit a confirmation message to the SMF after the application relocation.

Step 611: providing a data transmission service for the UE through the newly-selected anchor UPF.

Upon the receipt of the confirmation message, the SMF establishes the optimum path for the UE to access the EC application through the selected new anchor UPF. To be specific, the optimum path may be established through: (A) triggering a UL-CL insertion procedure, and installing data flow information corresponding to the application ID to a UL-CL so that the UL-CL routes a data flow for accessing the edge computing application to the new anchor UPF; (B) for a PDU session with an IPv6 address assigned for the UE, establishing a branch point and assigning a new IPv6 address prefix, so that the UE accesses the edge computing application through a newly-assigned IPv6 address; and (C) requesting the UE to establish a new PDU session, and selecting the new anchor UPF to provide a service for the UE.

Third Embodiment

In this embodiment, the NWDAF provides the user experience analysis for the EC application for the AF.

The data analysis provided by the NWDAF includes the following tables in Table 2.

TABLE 2

User experience analysis of EC application (> represents that there is an inclusive relation between entries)

| Information | Description |
| --- | --- |
| EC Application ID | Identifier of the EC application |
| S-NSSAI | Identifier of a slice to which the EC application belongs |
| EC Service experiences (0-x) | User experience distribution of the EC application |
| >APP location | Position of the EC application, represented by DNAI |

TABLE 2-continued

User experience analysis of EC application (> represents that there is an inclusive relation between entries)

| Information | Description |
| --- | --- |
| >Service Experience | User experiences caused when the UE accesses an application in a target data network at a designated region through a designated UPF, represented by MOS |
| >Location criteria | An area where the analysis is valid |
| >Validity period | Time period within which the analytic result is valid |
| >Confidence | Estimation of prediction accuracy |

In addition, when requesting the user experience analysis, the AF may also request the NWDAF to provide the DNAI recommendation information for ensuring the user experience and/or the service performance.

Figure 7:
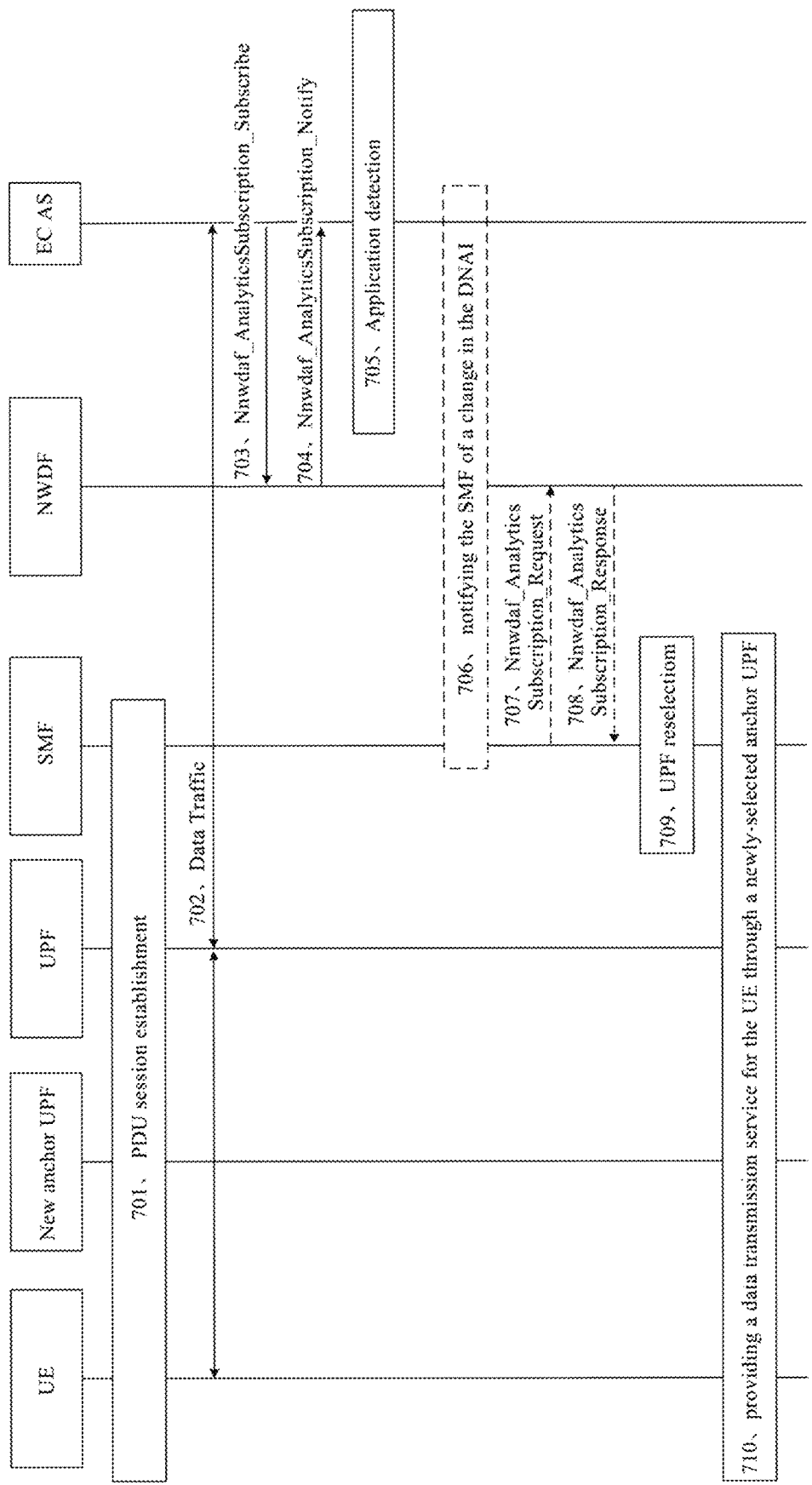
FIG. 7 is a schematic view showing a procedure of providing, by the NWDAF, the data analytic result to an AF according to a third embodiment of the present disclosure.

FIG. 7 shows a procedure of providing, by the NWDAF, the data analytic result for the AF. As shown in FIG. 7, based on the analysis provided by the NWDAF, the AF determines an optimum application server when the UE accesses the EC application, and the procedure includes the following steps.

Step 701: PDU session establishment.

Step 702: Data traffic.

The UE establishes a PDU session, and S-NSSAI and DNN carried in the PDU session represents that the PDU session will access an edge network. Data communication is performed between the UE and the EC application server.

Step 703: Nnwdaf_AnalyticsSubscription_Subscribe.

Step 704: Nnwdaf_AnalyticsSubscription_Notify.

In order to determine the edge computing application server for providing the optimum service for the UE, the EC AS may subscribe to the NWDAF the QoS analysis for the EC application. A subscription request carries the application ID and the UE location. After the completion of the data analysis, the NWDAF returns the user experience analysis for the EC application in Table 2 to the SMF.

Step 705: Application relocation.

Step 706: notifying the SMF of a change in the DNAI.

The EC AS determines a target DNAI where an optimum EC AS for serving the UE locates in accordance with the user experience analysis. When the target DNAI is different from a DNA where the EC AS is currently located, the EC AS relocates the UE to the target EC AS, i.e., performs application relocation. Then, the target EC AS notifies the SMF that the DNAI currently serving the UE has changed at least through an AF request influence traffic routing process defined in the 3GPP.

Step 707: Nnwdaf_AnalyticsSubscription_Request.

Step 708: Nnwdaf_AnalyticsSubscription_Response.

Step 709: UPF re-selection.

Upon the receipt of the notification, the SMF performs anchor UPF re-selection at least through the following two ways. (A) The SMF searches an appropriate UPF in accordance with the UE location and the target DNAI using a method known in the art. (B) The SMF requests the NWDAF to provide the user experience analysis for the EC application, and the request carries the UE location, the target DNAI and the S-NSSAI. The NWDAF provides the analytic result as shown in Table 1. Then, the SMF selects the anchor UPF for providing the optimum user experience from the analytic result.

Step 710: providing a data transmission service for the UE through a newly-selected anchor UPF.

After the selection of the target UPF, the SMF establishes an optimum path for the UE to access the EC application through the new anchor UPF, and the specific implementation thereof may refer to Step 611 in the second embodiment of the present disclosure.

Fourth Embodiment

In this embodiment, the NWDAF provides the performance analysis for the EC application.

In order to generate the user experience analysis for the EC application deployed on a 3GPP network, the NWDAF may collect relevant data from the SMF and the AF.

The data collected from the SMF is shown in the following table.

| Information | Description |
| --- | --- |
| Timestamp | Timestamp of the collected data |
| DNN | Data network name for accessing the EC application |
| S-NSSAI | Slice information for accessing the EC application |
| Application ID | Identifier of the EC application |
| IP filter information | ID of data flows visiting the EC application server, e.g., IP quintet |
| Anchor UPF ID | Identifier of an anchor UPF being used to forward a data flow visiting the EC application server |

The data collected from the AF is shown in the following table.

| Information | Description |
| --- | --- |
| Application ID | Identifier of the EC application |
| IP filter information | IDs of data flows visiting the EC application server, e.g., IP quintet |
| Locations of Application | Position of the EC application, represented by DNAI |
| Service Experience | User experiences on the EC application in a target data network identified by a DNAI when different data flows are in use, represented by Mean Opinion Score (MOS) |
| Timestamp | |
| IP flow Bit Rate | Actual uplink/downlink transmission rate of IP flow |
| Packet Delay | Actual uplink/downlink transmission delay of an IP packet |
| Packet transmission | The total quantity of transmitted data packets |
| Packet retransmission | The quantity of retransmitted data packets |

The NWDAF may associate the data collected form the SMF with the data collected from the AF in accordance with the timestamp and the IP filter information. The data analytic result generated by the NWDAF is shown in the following table.

TABLE 3 user experience analysis of EC application (> represents
that there is an inclusive relationship among the entries)

| Information | Description |
| --- | --- |
| EC Application ID | Identifier of the EC application |
| S-NSSAI | Identifier of a slice to which the EC application belongs |
| EC performance (0-x) | Performance of network serving the EC application |
| >APP location | Position of the EC application, represented by DNAI |
| >Serving anchor UPF | User plane anchor UPF serving the UE, identified by a UPF ID or an IP address of the UPF at an N6 interface |
| >Performance | Network performance when the UE accesses an application in a target data network at a designated region through a designated UPF |
| >>Average Traffic rate | Average transmission rate (e.g., an average calculated in accordance with statistical information about an IP flow bit rate of inputted data) |
| >>Maximum Traffic rate | Maximum transmission rate (e.g., a maximum value calculated in accordance with the statistical information about an IP flow bit rate of inputted data) |
| >>Average Packet Delay | Average transmission delay (e.g., an average calculated in accordance with statistical information about a packet delay of the inputted data) |
| >>Maximum Packet Delay | Maximum transmission delay (e.g., a maximum value calculated in accordance with the statistical information about the packet delay of the inputted data) |
| >>Average Packet Loss Rate | Average packet loss rate (e.g., a value obtained through a division operation on statistical information about packet transmission and packet retransmission of the inputted data) |
| >>Location criteria | An area where the analysis is valid (e.g., obtained in accordance with the UE location when the service is performed) |
| >>Validity period | Time period within which the analytic result is valid (e.g., generated in accordance with timestamp information when the service is performed) |
| >>Confidence | Estimation of prediction accuracy |

Fifth Embodiment

In this embodiment, the NWDAF provides the performance analysis for the EC application to the SMF and the AF.

Referring to the above second and third embodiments, the NWDAF provides the performance analysis for the EC application in the DNAI to the SMF and the AF.

The SMF selects a UPF anchor meets the Quality of Service (QoS) requirement in accordance with the UE location. The AF selects a DNAI for providing an appropriate EC service at the UE location in accordance with the requirement on the service.

Based on a same inventive concept, the present disclosure further provides in some embodiments an NWDAF, an SMF, an AF, a UPF determination device, an information providing device and a computer-readable storage medium. A principle of these devices for solving the problem is similar to that of the UPF determination method and the information providing method, so the implementation of these devices may refer to that of the methods, which will not be particularly defined herein.

The technical solutions in the embodiments of the present disclosure may be implemented as follows.

Figure 8:
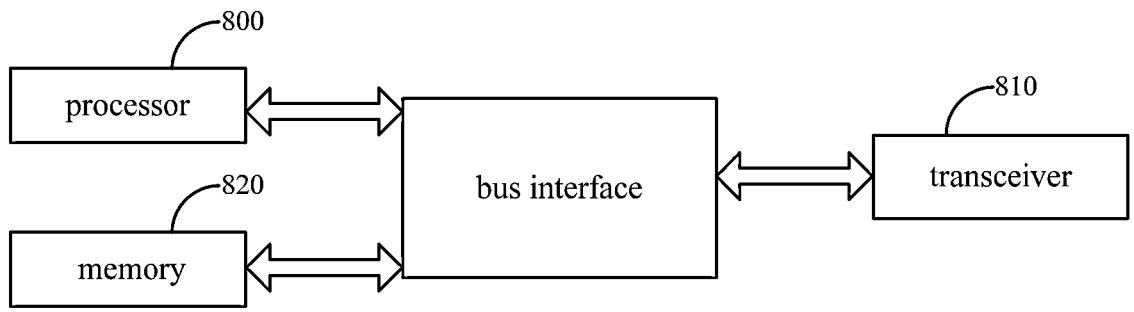
FIG. 8 is a schematic view showing the SMF according to one embodiment of the present disclosure.

As shown in FIG. 8, the present disclosure provides in some embodiments an SMF, which includes a processor 800, a memory 820 and a transceiver 810. The processor 800 is configured to read a program in the memory 820, so as to: transmit a user experience analytic request for a designated application and/or a performance analytic request for the application to an NWDAF; receive a user experience analytic result and/or the performance analytic result for the application from the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and determine the UPF for providing an edge computing service to the UE in accordance with the user experience analytic result for the application and/or the performance analytic result for the application. The transceiver 810 is configured to receive and transmit data under the control of the processor 800.

During the implementation, when determining the UPF for providing an edge computing service to the UE in accordance with the user experience analytic result for the application and/or the performance analytic result for the application, the processor is further configured to: obtain an application ID of an application to which the UE currently accesses; match the application ID for the application to which the UE currently accesses with the user experience analytic result and/or the performance analytic result for the application; when the application ID for the application to which the UE currently accesses matches the user experience analytic result and/or the performance analytic result for the application, select a serving anchor UPF corresponding to an entry of optimum user experience or optimum application performance in the analytic results in accordance with a position of the UE; and determine the serving anchor UPF as a new anchor UPF.

During the implementation, the processor is further configured to determine a serving anchor UPF in accordance with anchor UPF recommendation information provided by the NWDAF for ensuring optimum user experience and/or service performance.

During the implementation, the processor is further configured to establish an optimum path for the UE to access an edge computing application through the selected new anchor UPF.

During the implementation, the optimum path for the UE to access the edge computing application is established by the SMF through the selected new anchor UPF in one or more of: triggering a UL-CL insertion procedure, and installing data flow information corresponding to the application ID to a UL-CL so that the UL-CL routes a data flow for accessing the edge computing application to the new anchor UPF; for a PDU session with an IPv6 address assigned for the UE, establishing a branch point and assigning a new IPv6 address prefix, so that the UE accesses the edge computing application through a newly-assigned IPv6 address; or after the UE is requested to establish a new PDU session, selecting the new anchor UPF to provide a service for the UE.

During the implementation, the user experience analytic result received by the SMF from the NWDAF at least includes user experience distribution of the edge computing application.

During the implementation, the user experience distribution of the edge computing application includes one or more of: a position of the EC application represented by a DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience distribution of the edge computing application includes anchor UPF recommendation information for ensuring service performance.

During the implementation, the performance analytic result for the application received from the NWDAF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; and a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, the performance of the network serving the edge computing application includes anchor UPF recommendation information for ensuring the service performance.

In FIG. 8, bus architecture may include a number of buses and bridges connected to each other, so as to connect various circuits for one or more processors 800 and one or more memories 820. In addition, as is known in the art, the bus architecture may be used to connect any other circuits, such as a circuit for a peripheral device, a circuit for a voltage stabilizer and a power management circuit. A bus interface may be provided, and the transceiver 810 may consist of a plurality of elements, i.e., a transmitter and a receiver for communication with any other devices over a transmission medium. The processor 800 may take charge of managing the bus architecture as well as general processings. The memory 820 may store therein data for the operation of the processor 800.

The present disclosure further provides in some embodiments a UPF determination device, which includes: an SMF transmission module configured to transmit a user experience analytic request for a designated application and/or a performance analytic request for the application to an NWDAF; an SMF reception module configured to receive a user experience analytic result and/or the performance analytic result for the application from the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and an SMF determination module configured to determine the UPF for providing an edge computing service to the UE in accordance with the user experience analytic result for the application and/or the performance analytic result for the application.

The implementation of the device may refer to that of the UPF determination method at the SMF side.

For ease of description, the components of the device are divided into various modules or units on the basis of their functions. Of course, during the implementation, the functions of the modules or units may be achieved in one or more pieces of software or hardware.

Figure 9:
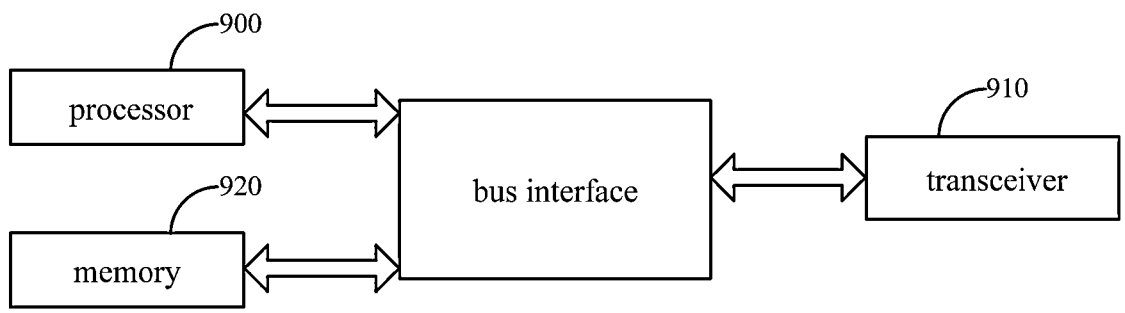
FIG. 9 is a schematic view showing the NWDAF according to one embodiment of the present disclosure.

As shown in FIG. 9, the present disclosure further provides in some embodiments an NWDAF, which includes a processor 900, a memory 920 and a transceiver 910. The processor 900 is configured to read a program in the memory 920, so as to: receive a user experience analytic request and/or a performance analytic request for a designated application from an SMF and/or an AF; generate a user experience analytic result and/or a performance analytic result for the application, the user experience analytic result and/or the performance analytic result including a user experience analysis and/or a performance analysis for the application corresponding to a location area, wherein the location area includes at least one of a UE location, an area where the application locates, or an area where a user plane anchor locates; and transmit the user experience analytic result and/or the performance analytic result to the SMF to select a user plane anchor and/or a target application. The transceiver 910 is configured to receive and transmit data under the control of the processor 900.

During the implementation, data for generating the user experience analytic result and/or the performance analytic result for the application is obtained from the SMF and/or the AF.

During the implementation, the data for generating the user experience analytic result for the application includes: one or more of the following data collected from the SMF: a timestamp of the collected data, a data network name for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, or user experiences on the application in a target data network identified by the DNAI when different data flows are in use.

During the implementation, the user experience analytic result for the application returned to the SMF at least includes user experience distribution of the edge computing application.

During the implementation, the user experience distribution of the edge computing application includes one or more of: a position of the EC application represented by a DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience analytic result and/or the performance analytic result for the application returned to the SMF includes anchor UPF recommendation information for ensuring optimum user experience and/or optimum service performance.

During the implementation, the user experience analytic result for the application returned to the AF at least includes user experience distribution of the edge computing application.

During the implementation, the user experience distribution of the edge computing application includes one or more of: a position of the EC application represented by a DNAI; user experiences caused when the UE accesses an application in a target data network at a designated region through a designated UPF; an area where the analysis is valid; a time period within which the analytic result is valid; or estimation of prediction accuracy.

During the implementation, data for generating the performance analytic result for the application includes: one or more of the following data collected from the SMF: a timestamp of the collected data, a data network name for accessing the application, slice information for accessing the application, an application ID, an ID of a data flow visiting an application server, or an identifier of an anchor UPF being used to forward the data flow visiting the application server; and one or more of the following data collected from the AF: the application ID, the ID of the data flow visiting the application server, a position of an EC application represented by a DNAI, user experiences on the application in a target data network identified by the DNAI when different data flows are in use, an actual uplink/downlink transmission rate of an IP flow, an actual uplink/downlink transmission delay of an IP data packet, the total quantity of transmitted data packets, or the quantity of retransmitted data packets.

During the implementation, the performance analytic result for the application returned to the SMF and/or the AF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; or a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, when generating the user experience analytic result for the application, the processor is further configured to: associate data collected from the SMF with data collected from the AF in accordance with a timestamp and IP filter information; and mine an association relationship between data through a machine learning algorithm, and generate the user experience analytic result for the application.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. The processor 900 may take charge of managing the bus architecture as well as general processings. The memory 920 may store therein data for the operation of the processor 900.

The present disclosure further provides in some embodiments an information providing device, which includes: an NWDAF reception module configured to receive a user experience analytic request and/or a performance analytic request for a designated application from an SMF and/or an AF; an NWDAF generation module configured to generate a user experience analytic result and/or a performance analytic result for the application, the user experience analytic result and/or the performance analytic result including a user experience analysis and/or a performance analysis for the application corresponding to a location area, wherein the location area includes at least one of a UE location, an area where the application locates, or an area where a user plane anchor locates; and an NWDAF transmission module configured to transmit the user experience analytic result and/or the performance analytic result to the SMF so that the SMF selects a user plane anchor and/or a target application.

The implementation of the device may refer to that of the information providing method at the NWDAF side.

For ease of description, the components of the device are divided into various modules or units on the basis of their functions. Of course, during the implementation, the functions of the modules or units may be achieved in one or more pieces of software or hardware.

Figure 10:
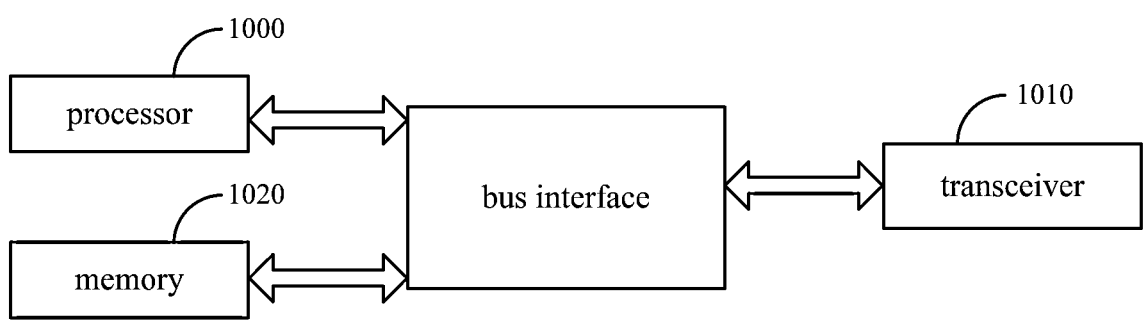
FIG. 10 is a schematic view showing an EC AS according to one embodiment of the present disclosure.

As shown in FIG. 10, the present disclosure further provides in some embodiments an EC AS, which includes a processor 1000, a memory 1020 and a transmitter 1010. The processor 1000 is configured to read a program in the memory 1020, so as to: transmit a user experience analytic request and/or a performance analytic request for an edge computing application to an NWDAF when a UE accesses the edge computing application; receive a user experience analytic result and/or a performance analytic result for the application to the NWDAF, the user experience analytic result and/or the performance analytic result including a correspondence between one or more of a location area where a UE locates, a position where the application locates, or a user plane anchor position and a user experience analysis and/or a performance analysis for the application; and determine a target DNAI where an optimum EC AS for providing an edge computing service for the UE locates in accordance with the user experience analytic result and/or the performance analytic result for the application, the DNAI being used by an SMF to reselect a UPF. The transceiver 1010 is configured to receive and transmit data under the control of the processor 1000.

During the implementation, the processor is further configured to notify the SMF of the target DNAI where the optimum EC AS locates through AF request influence traffic routing.

During the implementation, the user experience analytic result received by the EC AS from the NWDAF at least includes user experience distribution of the edge computing application.

During the implementation, the user experience distribution of the edge computing application includes one or more of: a position of the EC application represented by a DNAI; and a user plane anchor UPF serving the UE. The user experience distribution of the EC application includes one or more of the following parameters: an area where the analysis is valid; a time period within which the analytic result is valid; or estimation of prediction accuracy.

During the implementation, the user experience distribution of the edge computing application includes anchor UPF recommendation information for ensuring service performance.

During the implementation, the performance analytic result for the application received by the EC AS from the NWDAF includes one or more of: an edge computing application ID; an identifier of a slice to which the edge computing application belongs; or performance of a network serving the edge computing application.

During the implementation, the performance of the network serving the edge computing application includes one or more of: a position of the EC application represented by a DNAI; and a user plane anchor UPF serving the UE. When the UE accesses an application in a target data network at a designated region through a designated UPF, the network performance includes one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

During the implementation, the performance of the network serving the edge computing application includes anchor UPF recommendation information for ensuring the service performance.

In FIG. 10, bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1010 may consist of a plurality of elements, i.e., a transmitter and a receiver for communication with any other devices over a transmission medium. The processor 1000 may take charge of managing the bus architecture as well as general processings. The memory 1020 may store therein data for the operation of the processor 1000.

The present disclosure provides in some embodiments a UPF determination device, which includes: an EC AS transmission module configured to transmit a user experience analytic request and/or a performance analytic request for an edge computing application to an NWDAF when a UE accesses the edge computing application; an EC AS reception module configured to receive a user experience analytic result and/or a performance analytic result for the application to the NWDAF, the user experience analytic result and/or the performance analytic result including a user experience analysis and/or a performance analysis for the application corresponding to a location area, wherein the location area includes at least one of a User Equipment (UE) location, an area where the application locates, or an area where a user plane anchor locates; and an EC AS determination module configured to determine a target DNAI where an optimum EC AS for providing an edge computing service for the UE locates in accordance with the user experience analytic result and/or the performance analytic result for the application, the DNAI being used by an SMF to reselect a UPF.

The implementation of the device may refer to that of the UPF determination method at the EC AS side.

For ease of description, the components of the device are divided into various modules or units on the basis of their functions. Of course, during the implementation, the functions of the modules or units may be achieved in one or more pieces of software or hardware.

The present disclosure further provides in some embodiments a computer-readable storage medium storing therein a computer program for implementing the above-mentioned methods for determining the UPF at the SMF side and the EC AS side, and the above-mentioned information providing method at the NWDAF side.

The implementation of the computer-readable storage medium may refer to those of the methods for determining the UPF at the SMF side and the EC AS side, and the information providing method at the NWDAF side.

In a word, according to the embodiments of the present disclosure, the NWDAF receives the data analytic request for the application from the SMF or the AF, and analyzes the application run data collected by the SMF and the AF. The generated data analytic result includes the user experience or service running performance corresponding to one or more of the position for the application, the area where the UE locates, or the user plane anchor position. Then, the NWDAF transmits the data analytic result to the SMF so that the SMF optimize the user plane path in accordance with the analytic result, and transmits the data analytic result to the AF so that the AF adjusts a position of the target application in accordance with the analytic result.

According to the embodiments of the present disclosure, a transmission path and a target service server are selected in accordance with the user experience or the service performance. As a result, it is able to ensure the user experience and the service performance accordingly.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, these modules may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information providing method, comprising:
receiving, by a Network Data Analytics Functions (NWDAF), a user experience analytic request and/or a performance analytic request for a designated application from a Session Management Function (SMF) and/or an Application Function (AF);
generating, by the NWDAF, a user experience analytic result and/or a performance analytic result for the application, the user experience analytic result and/or the performance analytic result comprising a user experience analysis and/or a performance analysis for the application corresponding to a location area, wherein the location area comprises at least one of a User Equipment (UE) location, an area where the application locates, or an area where a user plane anchor locates; and
transmitting, by the NWDAF, the user experience analytic result and/or the performance analytic result to the SMF to select a user plane anchor and/or a target application,
wherein the user experience analytic result for the application returned to the SMF at least comprises user experience distribution of the edge computing application, wherein the user experience distribution of the edge computing application comprises one or more of: a position of the EC application represented by a DNAI; or a user plane anchor UPF serving the UE, wherein the user experience distribution of the EC application comprises one or more of the following parameters: an area where the analysis is valid; a time period within which the analytic result is valid; or estimation of prediction accuracy, or,
wherein the performance analytic result for the application returned to the SMF comprises performance of a network serving the edge computing application, wherein the performance of the network serving the edge computing application comprises one or more of: a position of the EC application represented by a DNAI; or a user plane anchor UPF serving the UE, wherein when the UE accesses an application in a target data network at a designated region through a designated UPF, the performance comprises one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy.

2. The information providing method according to claim 1, wherein data for generating the user experience analytic result and/or the performance analytic result for the application is obtained from the SMF and/or the AF.

3. The information providing method according to claim 2, wherein the data for generating the user experience analytic result for the application comprises:
one or more of the following data collected from the SMF: a timestamp of the collected data, a Data Network Name (DNN) for accessing the application, slice information for accessing the application, an application Identifier (ID), an ID of a data flow visiting an application server, or an identifier of an anchor UPF being used to forward the data flow visiting the application server; and
one or more of the following data collected from the AF: the application ID, the ID of the data flow visiting the application server, a position of an Edge Computing (EC) application represented by a Data Network Access Identifier (DNAI), or user experiences on the application in a target data network identified by the DNAI when different data flows are in use.

4. The information providing method according to claim 2, wherein data for generating the performance analytic result for the application comprises:
one or more of the following data collected from the SMF: a timestamp of the collected data, a Data Network Name (DNN) for accessing the application, slice information for accessing the application, an application ID, an ID of a data flow visiting an application server, or an identifier of an anchor UPF being used to forward the data flow visiting the application server; and
one or more of the following data collected from the AF: the application ID, the ID of the data flow visiting the application server, a position of an EC application represented by a DNAI, user experiences on the application in a target data network identified by the DNAI when different data flows are in use, an actual uplink/downlink transmission rate of an Internet Protocol (IP) flow, an actual uplink/downlink transmission delay of an IP data packet, the total quantity of transmitted data packets, or the quantity of retransmitted data packets.

5. The information providing method according to claim 1, wherein the user experience analytic result and/or the performance analytic result for the application returned to the SMF comprises anchor UPF recommendation information for ensuring optimum user experience and/or optimum service performance; or
wherein the user experience analytic result for the application returned to the AF at least comprises user experience distribution of the edge computing application; or
wherein the performance analytic result for the application returned to the SMF and/or the AF further comprises one or more of: an edge computing application ID; or an identifier of a slice to which the edge computing application belongs.

6. The information providing method according to claim 5, wherein the user experience distribution of the edge computing application comprises one or more of: a position of the EC application represented by a DNAI; user experiences caused when the UE accesses an application in a target data network at a designated region through a designated UPF; an area where the analysis is valid; a time period within which the analytic result is valid; or estimation of prediction accuracy.

7. The information providing method according to claim 1, further comprising:
transmitting, by the SMF, a user experience analytic request for a designated application and/or a performance analytic request for the application to the NWDAF;
receiving, by the SMF, the user experience analytic result and/or the performance analytic result for the application from the NWDAF, the user experience analytic result and/or the performance analytic result comprising a user experience analysis and/or a performance analysis for the application corresponding to a location area, wherein the location area comprises at least one of a User Equipment (UE) location, an area where the application locates, or an area where a user plane anchor locates; and
determining, by the SMF, the UPF for providing an edge computing service to the UE in accordance with the user experience analytic result for the application and/or the performance analytic result for the application.

8. The UPF determination method according to claim 7, wherein the determining, by the SMF, the UPF for providing an edge computing service to the UE in accordance with the user experience analytic result for the application and/or the performance analytic result for the application comprises:
obtaining, by the SMF, an application Identifier (ID) of an application to which the UE currently accesses;
matching the application ID for the application to which the UE currently accesses with the user experience analytic result and/or the performance analytic result for the application;
when the application ID for the application to which the UE currently accesses matches the user experience analytic result and/or the performance analytic result for the application, selecting a serving anchor UPF corresponding to an entry of optimum user experience or optimum application performance in the analytic results in accordance with a position of the UE;
determining, by the SMF, the serving anchor UPF as a new anchor UPF; and
establishing, by the SMF, an optimum path for the UE to access an edge computing application through the selected new anchor UPF.

9. The UPF determination method according to claim 7, further comprising determining a serving anchor UPF in accordance with anchor UPF recommendation information provided by the NWDAF for ensuring optimum user experience and/or service performance; and
establishing, by the SMF, an optimum path for the UE to access an edge computing application through the selected new anchor UPF.

10. The UPF determination method according to claim 9, wherein the optimum path for the UE to access the edge computing application is established by the SMF through the selected new anchor UPF in one or more of:
triggering an Uplink-Classifier (UL-CL) insertion procedure, and installing data flow information corresponding to the application ID to a UL-CL so that the UL-CL routes a data flow for accessing the edge computing application to the new anchor UPF;
for a Protocol Data Unit (PDU) session with an IPv6 address assigned for the UE, establishing a branch point and assigning a new IPv6 address prefix, so that the UE accesses the edge computing application through a newly-assigned IPv6 address; or after the UE is requested to establish a new PDU session, selecting the new anchor UPF to provide a service for the UE.

11. The UPF determination method according to claim 7, wherein the user experience analytic result received by the SMF from the NWDAF at least comprises user experience distribution of the edge computing application; and/or wherein the performance analytic result for the application received by the SMF from the NWDAF comprises one or more of: an edge computing application ID; an identifier of a slice to which the edge computing application belongs; or performance of a network serving the edge computing application.

12. The UPF determination method according to claim 11, wherein the user experience distribution of the edge computing application comprises one or more of: a position of the EC application represented by a DNAI; or a user plane anchor UPF serving the UE, wherein the user experience distribution of the EC application comprises one or more of the following parameters: an area where the analysis is valid; a time period within which the analytic result is valid; or estimation of prediction accuracy; and/or wherein the performance of the network serving the edge computing application comprises one or more of: a position of the EC application represented by a DNAI; or a user plane anchor UPF serving the UE, wherein when the UE accesses an application in a target data network at a designated region through a designated UPF, the network performance comprises one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy, wherein the performance of the network serving the edge computing application comprises anchor UPF recommendation information for ensuring the service performance.

13. The information providing method according to claim 1, further comprising:

transmitting, by an Edge Computing (EC) Application Server (AS), a user experience analytic request and/or a performance analytic request for an edge computing application to the NWDAF when a UE accesses the edge computing application;

receiving, by the EC AS, the user experience analytic result and/or a performance analytic result for the application to the NWDAF, the user experience analytic result and/or the performance analytic result comprising a user experience analysis and/or a performance analysis for the application corresponding to a location area, wherein the location area comprises at least one of a User Equipment (UE) location, an area where the application locates, or an area where a user plane anchor locates; and determining, by the EC AS, a target DNAI where an optimum EC AS for providing an edge computing service for the UE locates in accordance with the user experience analytic result and/or the performance analytic result for the application, the DNAI being used by an SMF to reselect a UPF.

14. The UPF determination method according to claim 13, further comprising notifying, by the EC AS, the SMF of the target DNAI where the optimum EC AS locates through AF request influence traffic routing; and/or wherein the user experience analytic result received by the EC AS from the NWDAF at least comprises user experience distribution of the edge computing application, wherein the user experience distribution of the edge computing application comprises one or more of: a position of the EC application represented by DNAI; and a user plane anchor UPF serving the UE, wherein the user experience distribution of the EC application comprises one or more of the following parameters: an area where the analysis is valid; a time period within which the analytic result is valid; or estimation of prediction accuracy.

15. The UPF determination method according to claim 13, wherein the performance analytic result for the application received by the EC AS from the NWDAF comprises one or more of: an edge computing application ID; an identifier of a slice to which the edge computing application belongs; or performance of a network serving the edge computing application, wherein the performance of the network serving the edge computing application comprises one or more of: a position of the EC application represented by a DNAI; or a user plane anchor UPF serving the UE, wherein when the UE accesses an application in a target data network at a designated region through a designated UPF, the network performance comprises one or more of the following parameters: an average transmission rate, a maximum transmission rate, an average transmission delay, a maximum transmission delay, an average packet loss rate, an area where the analysis is valid, a time period within which the analytic result is valid, or estimation of prediction accuracy, wherein the performance of the network serving the edge computing application comprises anchor UPF recommendation information for ensuring the service performance.

16. An SMF, comprising a processor, a memory and a transceiver, wherein the processor is configured to read a program in the memory, so as to realize the UPF determination method according to claim 7, wherein the transceiver is configured to receive and transmit data under the control of the processor.

17. An NWDAF, comprising a processor, a memory and a transceiver, wherein the processor is configured to read a program in the memory, so as to realize the information providing method according to claim 1, wherein the transceiver is configured to receive and transmit data under the control of the processor.

18. An EC AS, comprising a processor, a memory and a transceiver, wherein the processor is configured to read a program in the memory, so as to realize the UPF determination method according to claim 13, wherein the transceiver is configured to receive and transmit data under the control of the processor.

* * * * *